(12) United States Patent
Wang et al.

(10) Patent No.: US 9,152,930 B2
(45) Date of Patent: Oct. 6, 2015

(54) EXPEDITED INTERNATIONAL FLIGHT ONLINE CHECK-IN

(71) Applicant: UNITED AIRLINES, INC., Chicago, IL (US)

(72) Inventors: Zhi Wang, Stafford, TX (US); Sripriya Punugoti, Sugar Land, TX (US); Jarod Velasquez, Houston, TX (US); Mark Nasr, Chicago, IL (US)

(73) Assignee: UNITED AIRLINES, INC., Chicago, IL (US)

( * ) Notice: Subject to any disclaimer, the term of this patent is extended or adjusted under 35 U.S.C. 154(b) by 134 days.

(21) Appl. No.: 13/844,473

(22) Filed: Mar. 15, 2013

(65) Prior Publication Data

US 2014/0270400 A1 Sep. 18, 2014

(51) Int. Cl.
*G06K 9/00* (2006.01)
*G06Q 10/02* (2012.01)

(52) U.S. Cl.
CPC ............ *G06Q 10/02* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 6,058,304 A | 5/2000 | Callaghan et al. | |
| 6,094,640 A | 7/2000 | Goheen | |
| 6,910,628 B1 | 6/2005 | Sehr | |
| 7,593,595 B2 | 9/2009 | Heaney, Jr. et al. | |
| 8,023,741 B2 | 9/2011 | Ferman et al. | |
| 8,077,930 B2 | 12/2011 | Hauke | |
| 8,139,900 B2 | 3/2012 | Gokturk et al. | |
| 8,144,939 B2 | 3/2012 | Thorn | |
| 8,215,546 B2 | 7/2012 | Lin et al. | |
| 2004/0078335 A1 | 4/2004 | Calvesio et al. | |
| 2008/0302870 A1* | 12/2008 | Berini et al. | 235/380 |
| 2009/0080708 A1* | 3/2009 | Mellen et al. | 382/115 |
| 2010/0078475 A1* | 4/2010 | Lin et al. | 235/380 |
| 2011/0128360 A1* | 6/2011 | Hatzav et al. | 348/61 |
| 2011/0196794 A1* | 8/2011 | Mak | 705/50 |
| 2014/0279519 A1 | 9/2014 | Mattes et al. | |

FOREIGN PATENT DOCUMENTS

| | | |
|---|---|---|
| KR | 10-2007-0040907 | 4/2007 |
| KR | 20-0448213 Y1 | 3/2010 |

OTHER PUBLICATIONS

International Search Report & Written Opinion from International Application No. PCT/US2014/028490 dated Aug. 1, 2014.

* cited by examiner

*Primary Examiner* — Siamak Harandi
(74) *Attorney, Agent, or Firm* — Marshall, Gerstein & Borun LLP (57) ABSTRACT

A user may check-in to an international flight and receive an electronic boarding pass using captured travel document information. If the travel document information has not been captured, the travel document information may be captured from a travel document by one of visual image capture or wireless communication. Visual image capture includes capturing an image of the travel document, performing optical character recognition (OCR) on the image of the travel document to extract text; and storing the extracted text on a computer-readable medium. Wireless communication includes receiving travel document information from a wireless communication device included in the travel document. The captured travel document information is compared to a list of registered passengers to determine if the passenger associated with the travel document is registered for the international flight. If the passenger is determined to be registered for the first international flight an electronic boarding pass is generated.

14 Claims, 9 Drawing Sheets

EXPEDITED INTERNATIONAL FLIGHT ONLINE CHECK-IN

BACKGROUND OF THE DISCLOSURE

1. Field of the Disclosure

The present disclosure relates to online checking-in for international flights and, more particularly, to the use of electronically stored travel document information to expedite the check-in process.

2. Brief Description of Related Technology

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

As smartphones with high resolution displays have become more and more popular, airlines have begun providing electronic boarding passes for travelers to use in lieu of printed boarding passes. In addition to saving paper, these electronic boarding passes enable a tech savvy traveler to avoid having to wait in a line to receive a printed boarding from airline personnel or an airline kiosk and minimize the amount of items he or she must carry to travel. The electronic boarding passes may completely replace the printed boarding passes, allowing travelers to pass through security and board the airplane by having security or airline personal scan an icon (typically a two dimensional barcode) on the display of the smartphone to authenticate the electronic boarding pass.

However, electronic boarding passes for international flights present challenges. If an airline transports a person without proper travel documentation across an international border, the airline may be forced to transport that person back to his or her country of origin and pay a fine to the US government or a foreign government. In particular, if the airline neglects to verify the person's travel documents either visually and/or electronically, the airline may be fined. Accordingly, in the past electronic boarding passes have been impractical because the traveler would still have to present his or her travel documents to airline personnel or an airline kiosk for verification.

SUMMARY OF THE DISCLOSURE

Accordingly, it may be advantageous to provide a way to electronically verify travel documents without the traveler having to present the travel documents to airline personnel or an airline kiosk.

One embodiment of the techniques discussed below is a method of receiving an electronic boarding pass for a first international flight. The method includes (a) capturing travel document information from a travel document by one of visual image capture or wireless communication, wherein the travel document is associated with a passenger; wherein visual image capture includes capturing an image of the travel document, performing optical character recognition (OCR) on the image of the travel document to extract text; and storing the extracted text on a computer-readable medium; wherein wireless communication includes receiving travel document information from a wireless communication device included in the travel document; (b) comparing the travel document information to a list of registered passengers for the first international flight to determine if the passenger associated with the travel document is registered for the first international flight; (c) if the passenger is determined to be registered for the first international flight, receiving an electronic boarding pass; wherein steps (a)-(c) are performed with one or more computer processors.

Another embodiment of the techniques described in the present disclosure is a network enabled device in communication with an airline check-in system, the network enabled device including: a computer processor; a communication block, wherein the communication block is configured to transmit and receive information from the airline check-in system; an image capture device; and a memory storing computer-readable instructions that when executed by the computer processor cause the network enabled device to implement: a travel document capture module, wherein the travel document capture module is configured to capture an image of a travel document associated with a passenger, store the image of the travel document in memory, and verify the quality of the image of the travel document; and a networking module to control the communication block, wherein the networking module is configured to instruct the communication block to transmit the image of the travel document to the airline check-in system, to receive text extracted from the image of the travel document using optical character recognition (OCR); and to receive an electronic boarding pass from the airline check-in system.

Another embodiment of the techniques described in the present disclosure is an airline check-in system for issuing electronic boarding passes, including: a network enabled device, wherein the network enabled device is configured to receive a first check-in request for a first international flight, send the first check-in request to an application server, receive an electronic boarding pass, and one of more of (i) capture an image of a travel document and communicate the image to one or more of an application server or an optical character recognition (OCR) server or (ii) capture travel document information via wireless communication with the travel document and communicate the captured travel document information to an application server, wherein each first check-in request and travel document is associated with a passenger; an OCR server, wherein the OCR server is configured to receive an image of a travel document captured by the one or more network enabled devices, extract text from the image of the travel document, and transmit the extracted text to an application server; and an application server, wherein the application server is configured to generate an electronic travel document record by one of more of (i) receiving extracted text from the travel document from the OCR server and storing the extracted text in the electronic travel document record or (ii) receive travel document information captured via wireless communication and storing the travel document information captured via wireless communication in the electronic travel document record; compare the first check-in request and electronic travel document record to a list of passengers registered for the first international flight, and if the first check-in request and electronic travel document are associated with a passenger who on the list of passengers for the first international flight, send a first electronic boarding pass to the network enabled device.

BRIEF DESCRIPTION OF THE DRAWING FIGURES

The figures described below depict various aspects of the system and methods disclosed herein. It should be understood that each figure depicts an embodiment of a particular aspect of the disclosed system and methods, and that each of the figures is intended to accord with a possible embodiment of thereof. Further, wherever possible, the following description refers to the reference numerals included in the following figures, in which features depicted in multiple figures are designated with consistent reference numerals.

DETAILED DESCRIPTION OF PREFERRED EMBODIMENTS

Figure 1A:
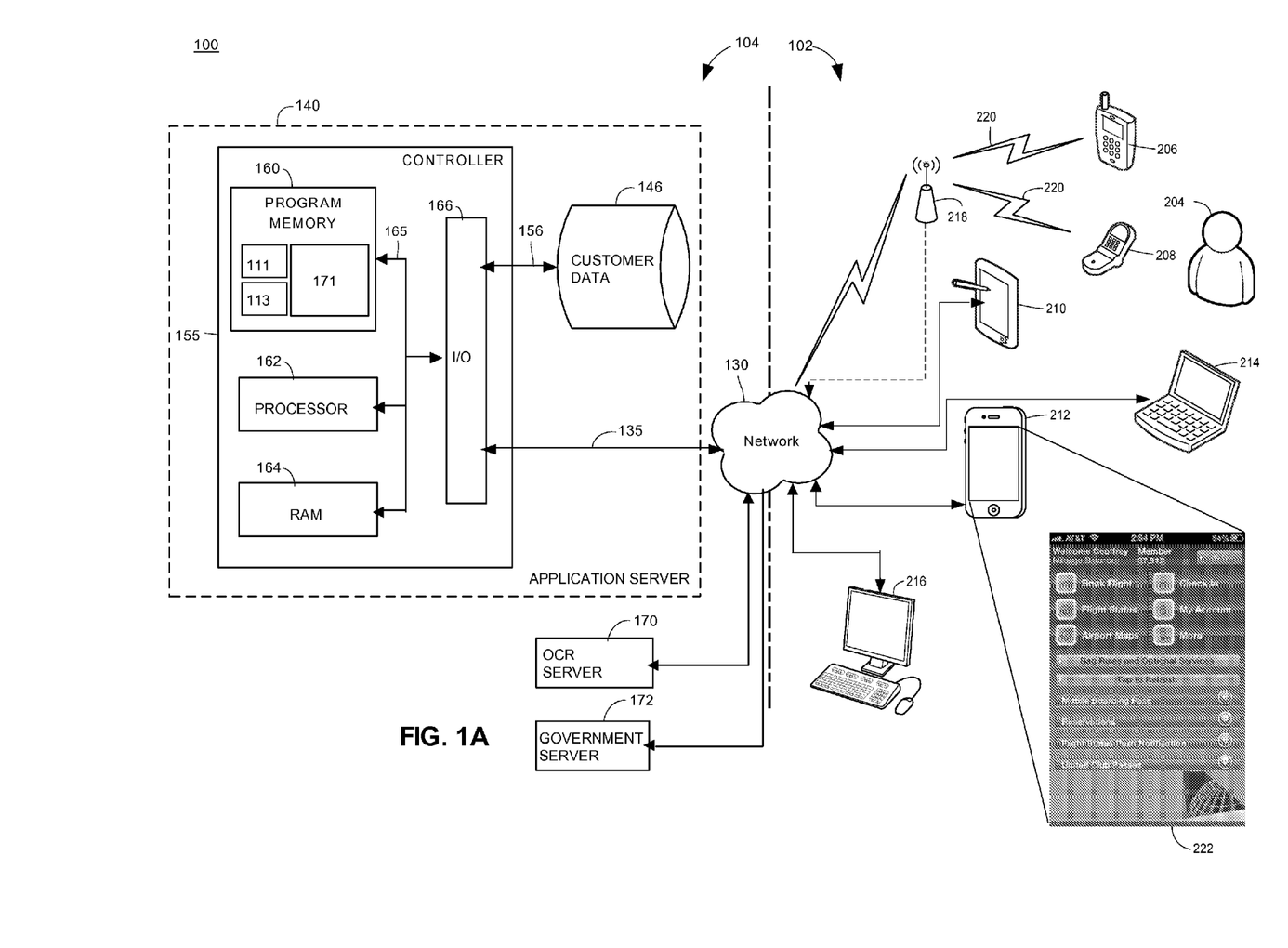
FIGS. 1A and 1B are block diagrams of an example system in which techniques for delivering an electronic boarding pass for an international flight and capturing travel document information are implemented.
Figure 1B:
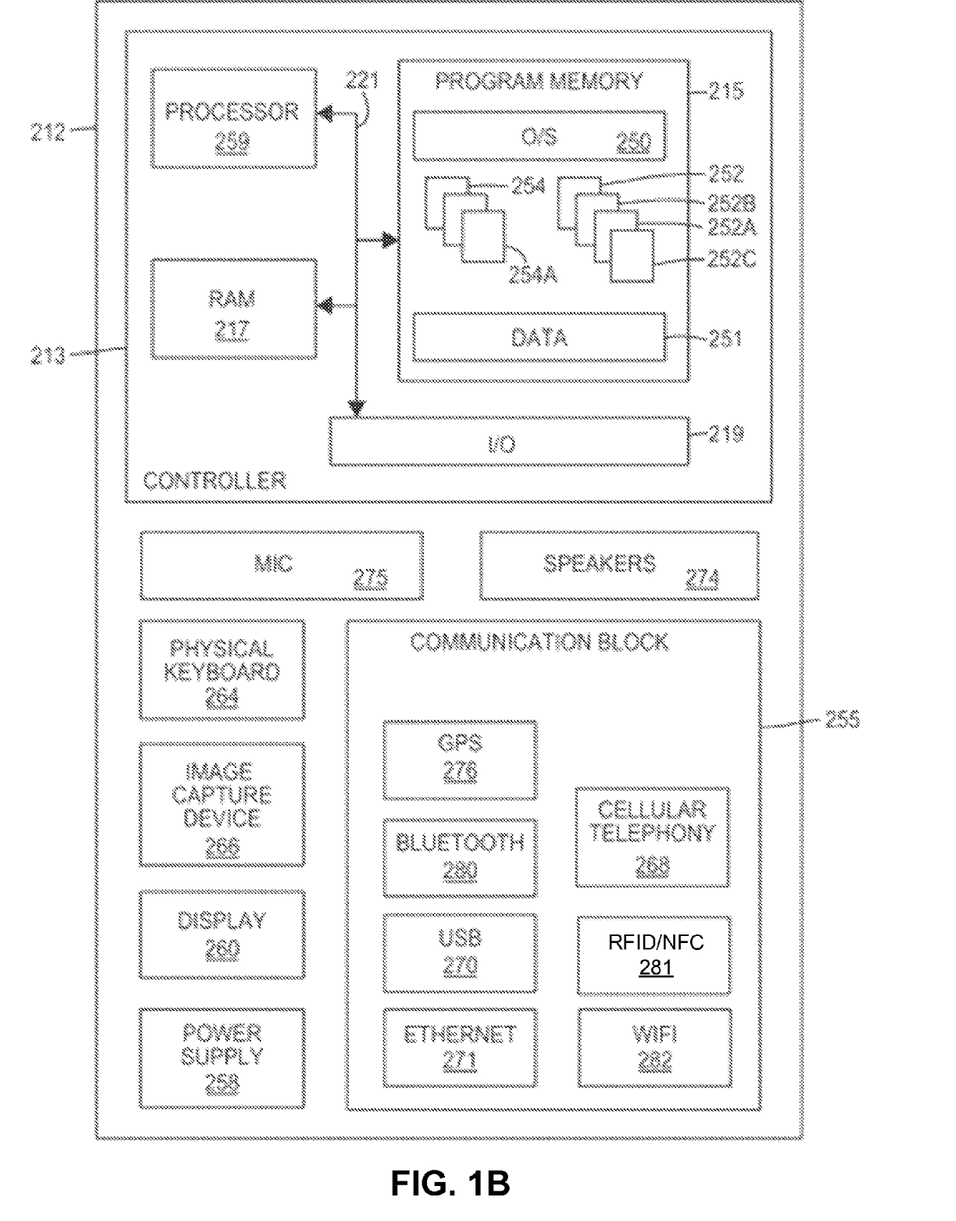

FIGS. 1A and 1B illustrate various aspects of an exemplary architecture implementing an electronic boarding pass system 100. In particular, FIG. 1A illustrates a block diagram of the exemplary electronic boarding pass system 100. The high-level architecture includes both hardware and software applications, as well as various data communications channels for communicating data between the various hardware and software components. The electronic boarding pass system 100 may be roughly divided into front-end components 102 and back-end components 104. The front-end components 102 are primarily disposed within one or more of the devices 206-216. The devices 206-216 may be located, by way of example rather than limitation, in separate geographic locations from each other, including different areas of the same city, different cities, or even different states.

For purposes of implementing the electronic boarding pass system 100, the customer interacts with airline systems (e.g., the application server 140) via a network server such as a web server communicating via HTTP (hypertext transfer protocol) or any other type of information server capable to transmit information according to any network communications protocol. The network enabled devices may include, by way of example, a network-enabled cell a wireless terminal 206, phone 208, a tablet computer or personal digital assistant (PDA) 210, a smartphone 212, a laptop computer 214, a desktop computer 216, a tablet computer, an airline kiosk terminal, a portable media player, an e-reader, or other similar devices (not shown). Of course, any network-enabled device appropriately configured may interact with the electronic boarding pass system 100. For convenience, throughout the remainder of this description the system 100 will be described with reference to the device 212 (i.e., the smartphone). However, it should be understood that, unless otherwise stated, any reference to the device 212 should be understood as referring to any one of the network enabled devices 206-216.

The front-end components 102 communicate with the back-end components 104 via the digital network 130. One or more of the front-end components 102 may be excluded from communication with the back-end components 104 by configuration or by limiting access due to security concerns. For example, it may be advantageous for each network enabled device 206-216 to be associated with a user name (e.g., a frequent flier program number such as the MileagePlus® program offered by United Airlines), and to require a password before allowing the network enabled device 206-216 to access various programs and routines stored in the back-end components 104. The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol.

The devices 206-216 need not necessarily communicate with the network 130 via a wired connection. In some instances, the devices 206-216 may communicate with the network 130 via wireless signals 220 and, in some instances, may communicate with the network 130 via an intervening wireless or wired device 218, which may be a wireless router, a wireless repeater, a base transceiver station of a mobile telephony provider, etc. Each of the network-enabled devices 206-216 may interact with the network server 202 to receive information including web pages or other information adapted to be displayed on a screen, such as the screen 222 depicted in FIG. 10, for display on the device 212. It will be appreciated that although only one network information server 202 is depicted in FIG. 10, multiple web servers 202 may be provided for the purpose of distributing server load, serving different web pages, implementing different portions of the pharmacy web interface, etc.

The back-end components 104 include an application server 140. Of course, the devices 206-216 may be communicatively connected to different back-end components 104 having one or more functions or capabilities that are similar to the application server 140. The application server 140 may include one or more computer processors 162 adapted and configured to execute various software applications and components of the electronic boarding pass system 100, in addition to other software applications, such as airline ticketing, check-in, and schedule management systems. The application server 140 further includes a database 146. The database 146 is adapted to store data related to the operation of the electronic boarding pass system 100 (e.g., user profile user data including name; age; sex; address(es); contact information; past, current, and future flight reservations; etc.) The application server 140 may access data stored in the database 146 when executing various functions and tasks associated with the operation of the electronic boarding pass system 100.

Although the electronic boarding pass system 100 is shown to include one application server 140, one OCR server 170, and one government server 172 in communication with one of each of the devices 206-216 it should be understood that different numbers of application servers 140, OCR servers 170, government servers 172, and devices 206-216 may be utilized. For example, the digital network 130 (or other digital networks, not shown) may interconnect in the system 100 a plurality of included application servers 140, hundreds of OCR servers 170, and thousands of devices 206-216. According to the disclosed example, this configuration may provide several advantages, such as, for example, enabling near real-time uploads and downloads of information as well as periodic uploads and downloads of information. This provides for a primary backup of all the information generated in the electronic boarding pass system 100. Alternatively, some of the devices 206-216 may store data locally.

FIG. 1A also depicts one possible embodiment of the application server 140. The application server 140 may have a controller 155 operatively connected to the database 146 via a link 156 connected to an input/output (I/O) circuit 166. It should be noted that, while not shown, additional databases may be linked to the controller 155 in a known manner. The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

Various software applications resident in the front-end components 102 and the back-end components 104 implement functions related to airline ticketing, check-in, and scheduling, and provide various user interface means to allow users (e.g., customers) to access the system 100. One or more of the front-end components 102 and/or the back-end components 104 may include a user-interface application 111 for allowing a user, such as the customer or a customer service representative, to input and view data associated with the system 100, and to interact with the electronic boarding pass system 100 described below. In one embodiment, the user interface application 111 is a web browser client, and the application server 140 implements a server application 113 for providing data to the user interface application 111. However, the user interface application 111 may be any type of interface, including a proprietary interface, and may communicate with the application server 140 using any type of protocol including, but not limited to, file transfer protocol (FTP), telnet, hypertext-transfer protocol (HTTP), etc. Moreover, some embodiments may include the user interface application 111 running on one of the network-enabled devices 206-216 (as when a customer is accessing the system). The information sent to devices 206-216 from the application server 140 includes data retrieved from the database 146. The application server 140 may implement any known protocol compatible with the user-interface application 111 running on the devices 206-216 and adapted to the purpose of receiving and providing the necessary customer information during the mobile travel document scanning process. The application server 140 includes a mobile travel document scanning application 171 to carry out the functions of the mobile travel document scanning process discussed below. The mobile travel document scanning application 171 may be stored in one or more of the program memory 160 or RAM 164.

The back-end components 104 also include an optical character recognition (OCR) server 170 and a government server 172. The components of the OCR server 170 and the government server 172 are similar to those of the application server 140. Each of the OCR servers 170 and government servers 172 may include a controller including program memory, a microcontroller or a microprocessor, a random-access memory (RAM), and an input/output (I/O) circuit, all of which are interconnected via an address/data bus (not shown). The OCR server 170 includes an application including algorithms adapted to recognize one or more textual elements in images. For example, an algorithm may identify numbers, letters, and other characters printed on a travel document, in particular in a Machine Readable Zone (MRZ) of the travel document. Having identified the MRZ on the travel document in an image, the OCR server 170 may be able to identify the format of the information in the MRZ, and may thereafter extract from the travel document information necessary or desired for storing an electronic record for the travel document. The OCR server 170 may be configured to transmit the extracted text to the application server 140 over the network 130. Of course, it will be understood that functions of the OCR server 170 may also be performed by the application server 140. The government server 172 is configured to receive reports of travel document information periodically to verify that passengers engaging in international air travel have the proper travel documents. If an airline transports a passenger without proper travel documents, the government operating the government server 172 may fine the airline. Accordingly, it may be advantageous for the airline to check travel document information carefully prior to transporting a passenger. For example, the techniques discussed herein may allow an airline to verify a passenger's travel document information before allowing the passenger on an international flight.

FIG. 1B depicts a block diagram of an exemplary one of the user devices 206-216, for example the smartphone 212. The device 212 may operate in a variety of hardware and/or software configurations. The device 212 includes a controller 213. Similar to the controllers described above, the controller 213 includes a program memory 215, a microcontroller or a microprocessor 259, a random-access memory (RAM) 217, and an input/output (I/O) circuit 219, all of which are interconnected via an address/data bus 221. In some embodiments, the controller 213 may also include, or otherwise be communicatively connected to, a database (not shown) or other data storage mechanism (e.g., one or more hard disk drives, optical storage drives, solid state storage devices, SIM cards, etc.). It should be appreciated that although FIG. 1B depicts only one microprocessor 259, the controller 213 may include multiple microprocessors 259. Similarly, the memory of the controller 213 may include multiple RAMs 217 and multiple program memories 215. Although FIG. 1B depicts the I/O circuit 219 as a single block, the I/O circuit 219 may include a number of different types of I/O circuits. The controller 213 may implement the RAM(s) 217 and the program memories 215 as semiconductor memories, magnetically readable memories, and/or optically readable memories, for example.

The program memory 215 and/or the RAM 217 may store various applications (i.e., machine readable instructions) for execution by the microprocessor 259. For example, an operating system 250 may generally control the operation of the device 212 and provide a user interface to the device 212. Various applications 254 may allow the user 204 to perform various functions associated with the device 212. By way of example, and without limitation, the applications 254 may include, among other things: an application for accessing telephony services; an application for sending and/or receiving email; an application for sending and/or receiving text or short message service (SMS) messages; a calendar application; a contact list application; a web browsing application; etc. In particular, the applications 254 may include an application 254A for capturing electronic document data associated with electronic boarding pass system 100.

The program memory 215 and/or the RAM 217 may also store a variety of subroutines 252 for accessing specific functions of the device 212. By way of example, and without limitation, the subroutines 252 may include, among other things: a subroutine 252A for accessing geolocation services, a subroutine 252B for accessing image capture services, and other subroutines, for example, implementing software keyboard functionality, interfacing with other hardware in the device 212, etc.

The program memory 215 and/or the RAM 217 may further store data 251 related to the configuration and/or operation of the device 212, and/or related to the operation of one or more of the applications 254 or subroutines 252. For example, the data 251 may be image data captured by an image capture device, may be data input by a user, may be data received from a server (e.g., the application server 140), data determined and/or calculated by the processor 259, etc.

In addition to the controller 213, the device 212 may include other hardware resources. For example, the device 212 may include a power supply 258, which may be a battery in the case of a mobile device. The device 212 may also include various types of input/output hardware such as a visual display 260, a keyboard 264, an image capture device 266, one or more speakers 274, a microphone 275, and/or a pointing device (not shown). In an embodiment, the display 260 is touch-sensitive, and may cooperate with a software keyboard routine as one of the software routines 252 to accept user input.

The image capture device 266 may be any type of image capture device. In an embodiment in which the system 100 communicates with the device 212, the device 212 may include a built-in image capture device. Alternatively, the image capture device 266 may be, in some instances, external to the device 212, such as coupled to the device 212 via a serial connection (e.g., a universal serial bus, or "USB," connection). In some embodiments, the image capture device 266 includes adjustable focusing optics. In some embodiments, the image capture device 266 may also include optics for allowing the image capture device 266 to zoom. Neither zooming optics nor focusing optics are required, however. For example, the image capture device 266 may include focusing optics that focus at "infinity". The image capture device 266 may also include optics with an adjustable exposure setting and/or image stabilization.

Referring still to FIG. 1B, the device 212 may be configured with a communication block 255 including a variety of hardware for wireless and/or wired communications. Exemplary wireless communication hardware in the communication block 255 may include cellular telephony circuitry 268, GPS receiver circuitry 276, Bluetooth circuitry 280, Radio Frequency Identification (RFID) or Near Field Communication (NFC) circuitry 281, or Wi-Fi circuitry 282 (i.e., circuitry complying with an IEEE 802.11 standard), as well as hardware supporting any number of other wireless communications protocols. Exemplary wired communications hardware in the communication block 255 may include, for example, USB circuitry 270, Ethernet circuitry 271, and/or hardware supporting any number of other wired communications protocols.

It should be recognized that different mobile devices may implement different mechanisms for user input. In an example described above, the device 212 may have a touch sensitive display screen 260. Accordingly, "buttons" which are displayed on the screen and are not physical buttons, are "pressed" by touching the screen in the area of the button. However, those of ordinary skill in the art will readily appreciate that such user interface controls may be accomplished in other manners, such as using soft-keys, navigating controls using navigation buttons on a keyboard or using a roller ball, selecting numbers corresponding to different controls, entering information on a keyboard, etc. Additionally, the device 212 may receive voice commands via the microphone 275.

Such voice commands may be interpreted by an application 254 (e.g., the Siri® product from Apple Computer).

Typically, a user may launch or instantiate a user interface application (e.g., a web browser, mobile application, or other client application) from a network-enabled device, such as the network-enabled devices 206-216, to establish a connection with the network server 202 cooperating with the system 140 to implement the electronic boarding pass system 100. Moreover, the term "customer" is not limited to a single person, but may instead be any person or persons having a reason or desire to scan a travel document and receive an electronic boarding pass, whether the boarding pass(es) are related to a single customer or multiple customers. Generally, the term "user" is used when referring to a person who is operating the device 212.

Figure 2:
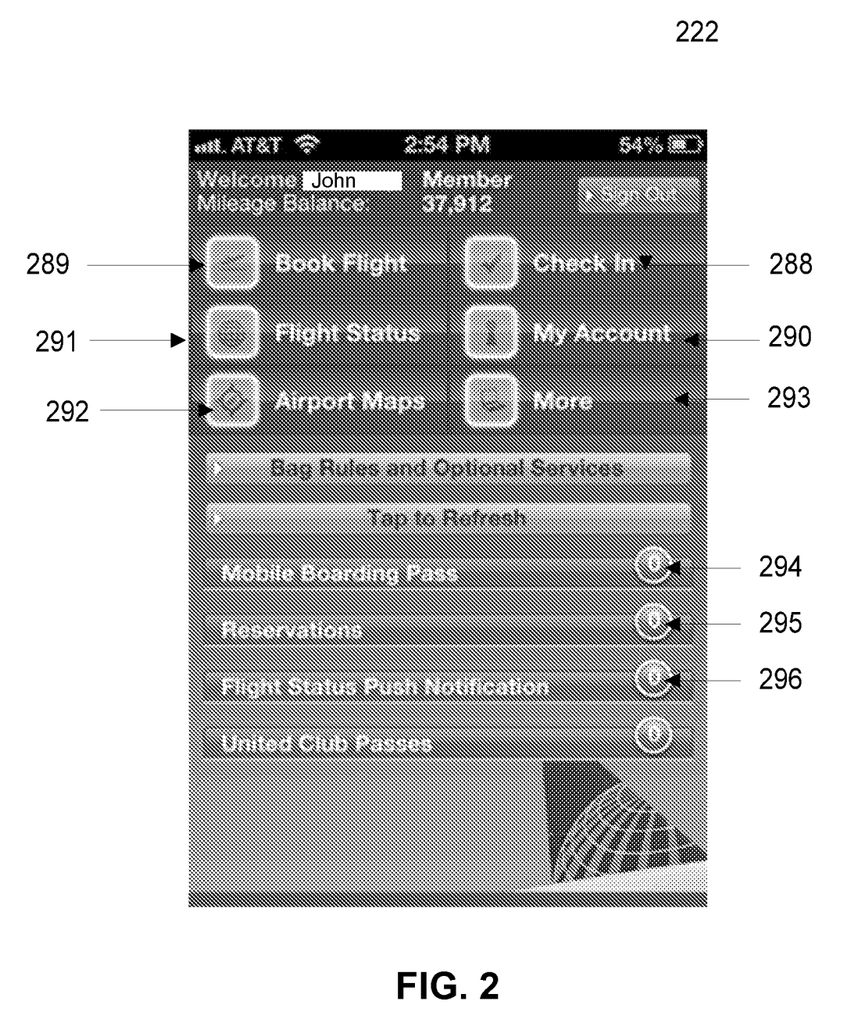
FIGS. 2-7 are example screenshots of displays presented to the user during the check-in and travel document capture process.

As described above, to access the electronic boarding pass system 100, the user 204 executes the client application 254A on the device 212. Using the application 254A, the user 204 may request and navigate a series of web pages or screens including information transmitted by the server 202 to the device 212. In some embodiments, the web page or screen may be transmitted as a whole by the server 202 to the device 212. In other embodiments, some portion of the web page or screen may reside in the program memory 215 of the device 212, while the server 202 transmits to the device 212 information to populate various fields of the web page or screen. FIGS. 2-7 depict exemplary web pages or screens that may be displayed by the application 254A in various embodiments of the electronic boarding pass system 100. Some of the web pages or screens share common elements. FIG. 2 depicts the home screen 222 (i.e., the web page or screen that is first presented to the user 204 when he executes the client application 254A). The home screen 222 contains buttons or links 252 that allow the user to navigate to different screens corresponding to functions of the application 254A.

It should be understood that it may be desirable for some or all of the data transmitted from the server 202 to the device 212, or vice versa, to be encrypted and/or otherwise transmitted in a secure manner (e.g., using Hypertext Transfer Protocol Secure, known as "HTTPS" or another secure communications protocol).

The screen 222 of the client application 254A depicted in FIG. 2 may include a link or button 288 related to the electronic boarding pass system, titled "Check In." The home screen 222 may include other links or buttons such as, for example, a "Book Flight" button 289, a "My Account" button 290, a "Flight Status" button 291, an "Airport Maps" button 292, a "More" button 293, a "View Mobile Boarding Pass" button 294, a "Reservations" button 295, and/or a "Flight Status Push Notification" button 296. The home screen may additionally include other buttons.

Figure 3:
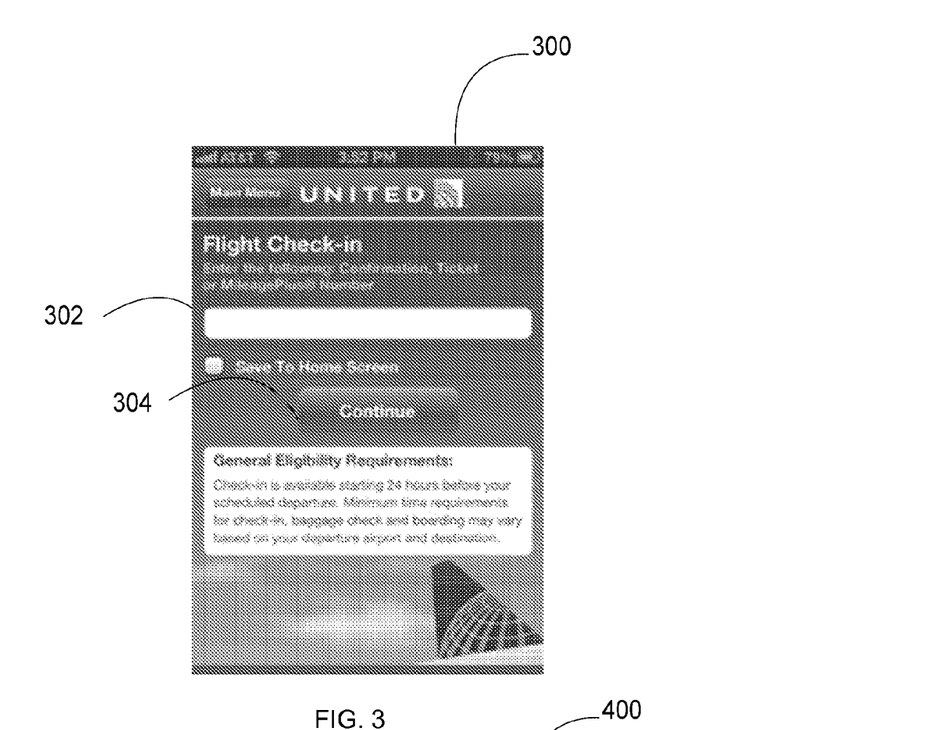

When the user 204 selects the "Check In" link or button 288, the application 254A may display a Check In screen 300, depicted in FIG. 3, with a text entry field 302 and a "Continue" button 304. The user may enter into the text entry field 302 a confirmation number associated with a travel itinerary, a ticket number, or a frequent flier program number (e.g., a number in the MileagePlus® program offered by United Airlines). After entering a number, the user 204 may retrieve an itinerary. Instead of selecting the "Check-In" button 288, the user 204 may access his or her travel itinerary by selecting the "Reservations" button 295, which may cause the application 254A to display a reservations screen (not shown) which may include all of the current and future reservations associated with the user's account (e.g., a frequent flier program such as the MileagePlus® program offered by United Airlines).

Figure 4:
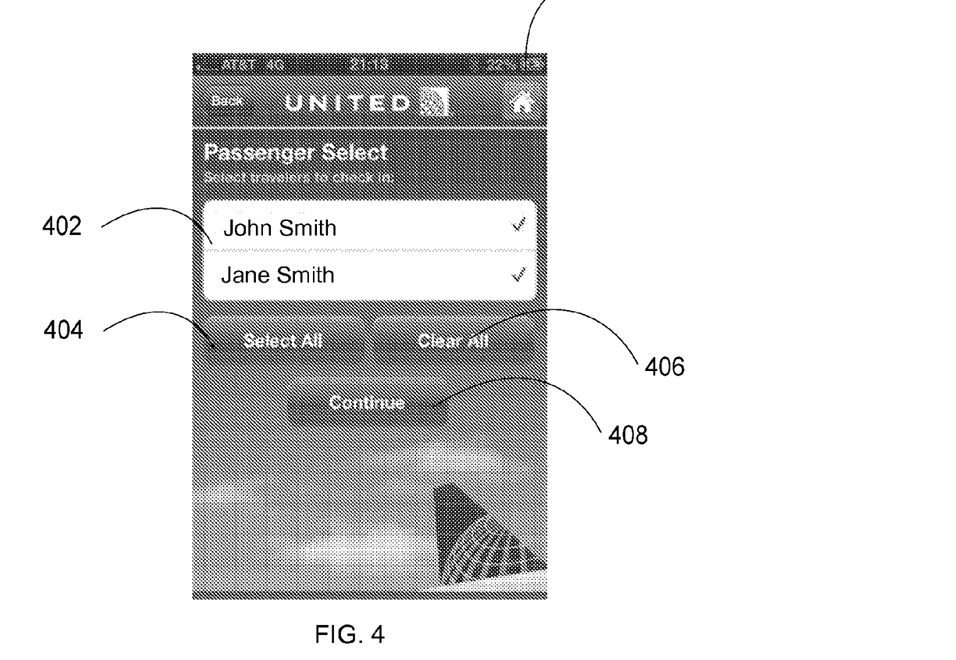

Once a travel itinerary has been retrieved, the application 254A may display a Passenger Select screen 400, depicted in FIG. 4. The screen 400 may include one or more entries 402 for passengers associated with the itinerary (e.g., a couple traveling together). The entries 402 may be buttons that when activated by the user select or deselect the passenger associated with the entry 402 for check in. Additionally, the screen 400 may be a "Select All" button 404 which may select all of the entries 402 associated with the itinerary and a "Clear All" button 406 which may deselect all of the entries 402 associated with the itinerary. After selecting the passenger(s) to check-in, the user may activate the "Continue" button 408 to continue the check-in process.

Figure 5:
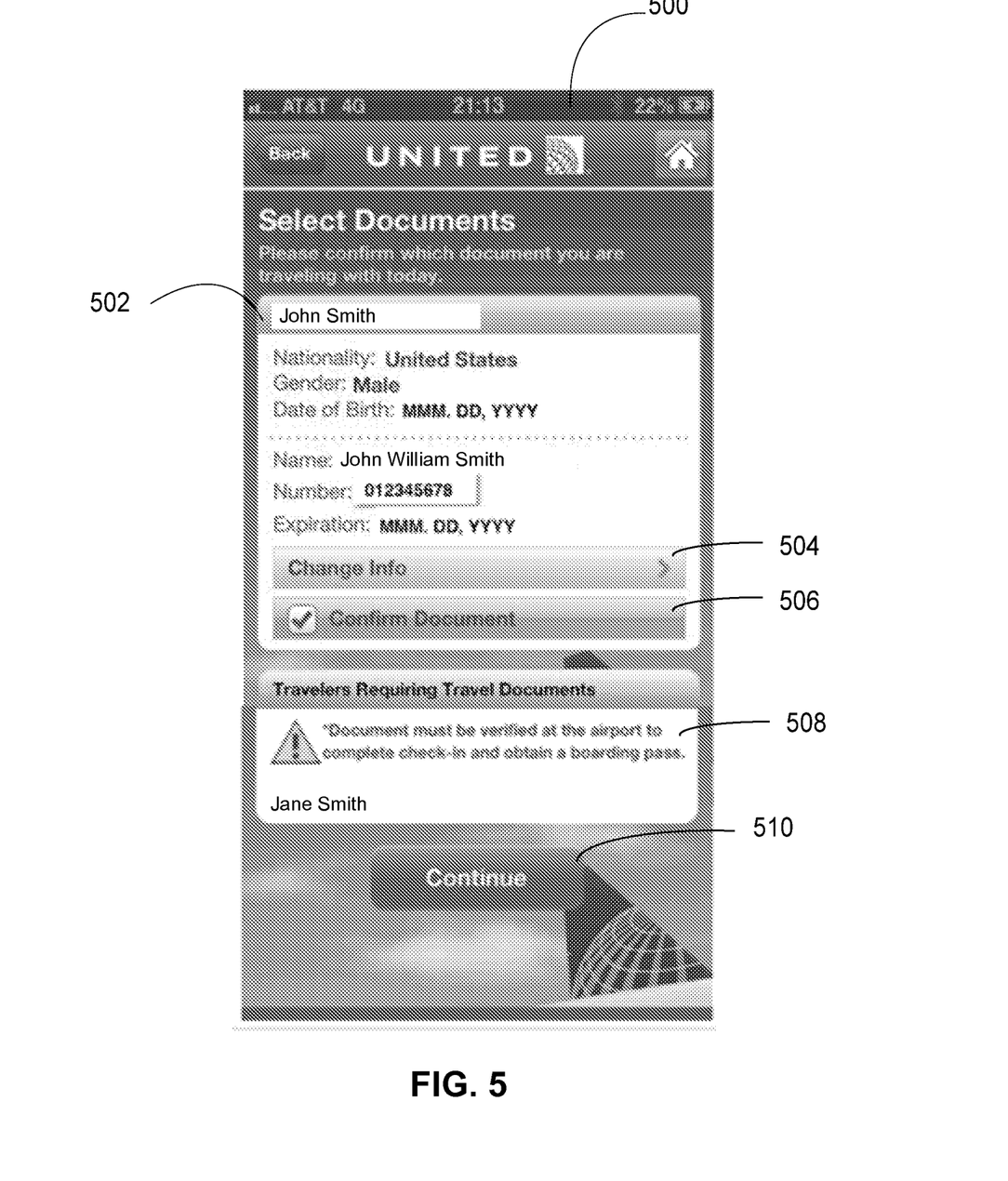

After the selection of the passenger(s) to be checked-in to a flight, the application 254A may display a Select Documents screen 500, depicted in FIG. 5. The screen 500 may include one or more current electronic document entries 502 and/or one or more missing electronic document entries 508. Each entry 502 may be an electronic record of a travel document (e.g., passport, permanent resident card, visa, credit card, etc.), especially an electronic record of a travel document made using the process described herein. As discussed below, the entry 502 may include any and all information required to verify that passenger has all of the appropriate travel documentation needed to travel internationally. For example, the entry 502 may include all of the information required for compliance with the Advanced Passenger Information System (APIS) such as full name, gender, date of birth, nationality, country of residence, travel document type (e.g., passport), travel document information (e.g., number, expiration date, country of issue, etc.), and address of first night spent in the United States (for individuals entering the US who are not US nationals, US legal permanent residents, or US alien residents). As discussed below, travel document information may be stored in a "virtual wallet" associated with the user's account (e.g., the user's frequent flier program account) and may be used for any international travel done by the user until the travel document information must be reviewed. For example, it may be advantageous to collect travel document information every calendar year to ensure the travel document information is accurate. The entry 502 may also include a "Change Info" button 504 which, when activated, may allow the user to update his or her travel information either by using the document capture process discussed herein or by typing on a keyboard or other input device. The entry 502 may also include a "Confirm Document" button 506 which the user may be required to select to indicate the user's approval of the entry 502. If some or all travel documentation information is missing from the user's account or the travel document information has expired, a missing electronic document entry 508 may be displayed. The missing electronic document entry 508 may include a note informing the user that he or she must capture the travel document information as discussed herein or present the physical travel document to an airline representative at the airport. The screen 500 also may include a "Continue" button 510, which the user may activate to continue the check-in process.

Figure 6:
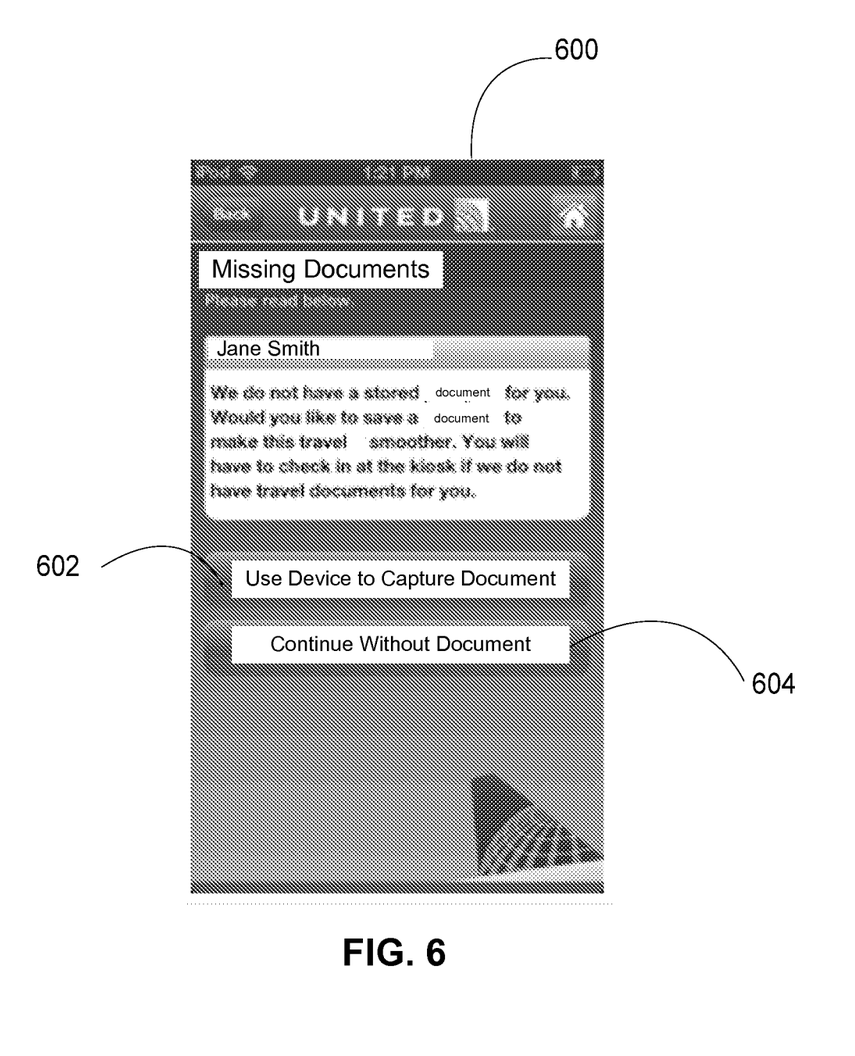

After the document selection associated with the screen 500, the application 254A may display a Missing Documents screen 600, depicted in FIG. 6. The screen 600 may include a "Use Device to Capture Document" button 602 and a "Continue Without Document" button 604. The user may activate the button 602 to capture the travel document information as discussed below or the user may activate the button 604 to continue without capturing the travel document. If the user opts to continue without the travel document, he or she may be able to change seats, view reservation information, and/or other tasks associated with the itinerary, but the user may not be able to receive an electronic boarding pass as discussed herein.

Figure 7:
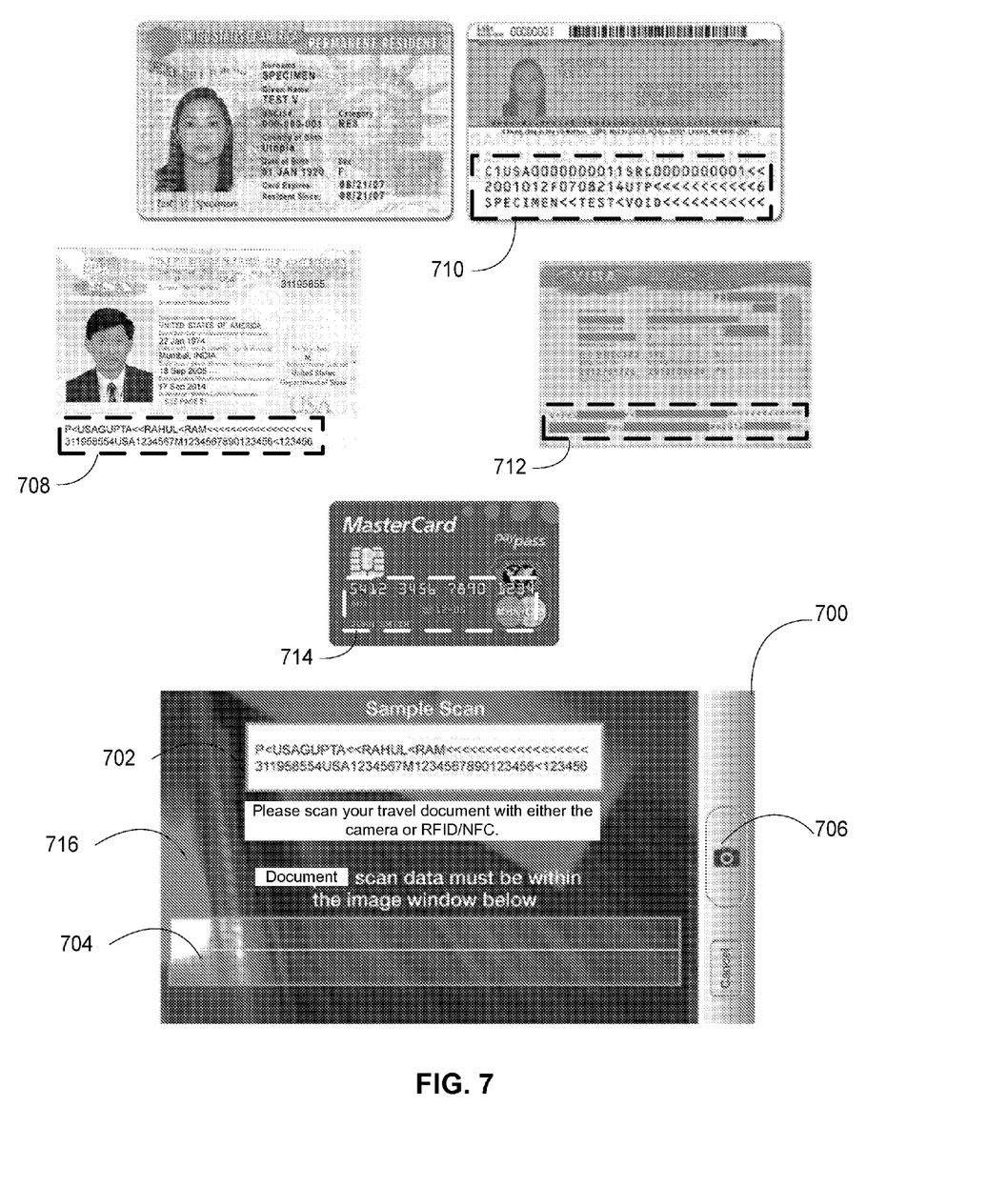

After opting to capture the missing travel document, the application 254A may invoke the subroutine 252B a Document Capture Screen 700, depicted in FIG. 7. The subroutine 252B causes the device 212 to activate the image capture device 266, and to display in the screen 700 a viewfinder 716 for displaying the image sensed by the image capture device 266 in real time. Additionally or alternatively, the application 254A may access the RFID/NFC device reader 281 to capture wirelessly transmitted information. The screen 700 may display instructions 702 regarding how to capture the travel document information. The instructions 702 may include a sample scan icon showing an example of a Machine Readable Zone (MRZ) that is included on a Machine Readable Travel Document. For example, an MRZ may include a US Passport MRZ 708, a US Permanent Resident Card MRZ 710, or a visa MRZ 712. The MRZ may be formatted using any formatting standard such as International Civil Aviation Organization Document 9303 (endorsed by the International Organization for Standardization and the International Electrotechnical Commission as ISO/IEC 7501-1). The screen 700 may also include a visual scan area 704 and a manual scan initiation button 706. It may be advantageous to automatically scan a travel document when an MRZ is detected inside the visual scan area 704 (e.g., the application 254A recognizes that the image capture device 266 has captured an image of an MRZ Additionally or alternatively, it may be advantageous to use a countdown timer to allow the user 204 to position MRZ the image capture (as discussed below) may occur automatically at the expiration of the countdown timer. Additionally or alternatively, it may be advantageous to allow the user 204 manually scan a travel document by positioning the device 212 and travel document such that the MRZ is within the visual scan area 704 and activating the manual scan initiation button 706.

When activated by the user 204, the manual scan initiation button 706 sends a signal to the subroutine 252B, which causes the device 212 and, in particular, the image capture device 266 to capture an image displayed in the viewfinder 512 and to store an image electronically in the memory 215 or in the RAM 217. Of course, depending on the operating system 250, the image capture device 266 need not necessarily be controlled via the subroutine 252A, but may, instead, be controlled directly by the client application 254A. In addition to causing the image capture device to capture and store an image, activating the manual scan initiation button 706 may also cause the application 254A to display an image confirmation screen (not shown). As discussed below, if the quality of the captured image is insufficient, the user 204 may be prompted to capture another image of the MRZ.

Though throughout this description, the application 254A is described as capturing and storing a single image 606, the description contemplates embodiments in which the application 254A captures and stores multiple images. Further, in some embodiments, multiple images may be stitched together into a panoramic image of the MRZ, by the application 254A, a sub-routine called by the application 254A, or by the application server 140. In still other embodiments, the application 254A may capture and/or transmit to the application server 140 video imagery (in the form of multiple individual images and/or as a video file) of the MRZ.

In addition to visually scanning an MRZ, the device 212 may also access an RFID and/or NFC embedded inside the travel document while displaying the screen 700. For example, the RFID/NFC device reader 281 may produce an electromagnetic field to induce an electrical current in an RFID or NFC chip embedded in a travel document. The electromagnetic field may induce a current inside a receiving coil of the RFID or NFC chip and cause a component of the RFID or NFC chip to wirelessly communicate information stored thereon according to known methods. In addition to travel documents, the screen 700 and techniques discussed herein may also be used to scan a credit card MRZ 714.

Figure 8:
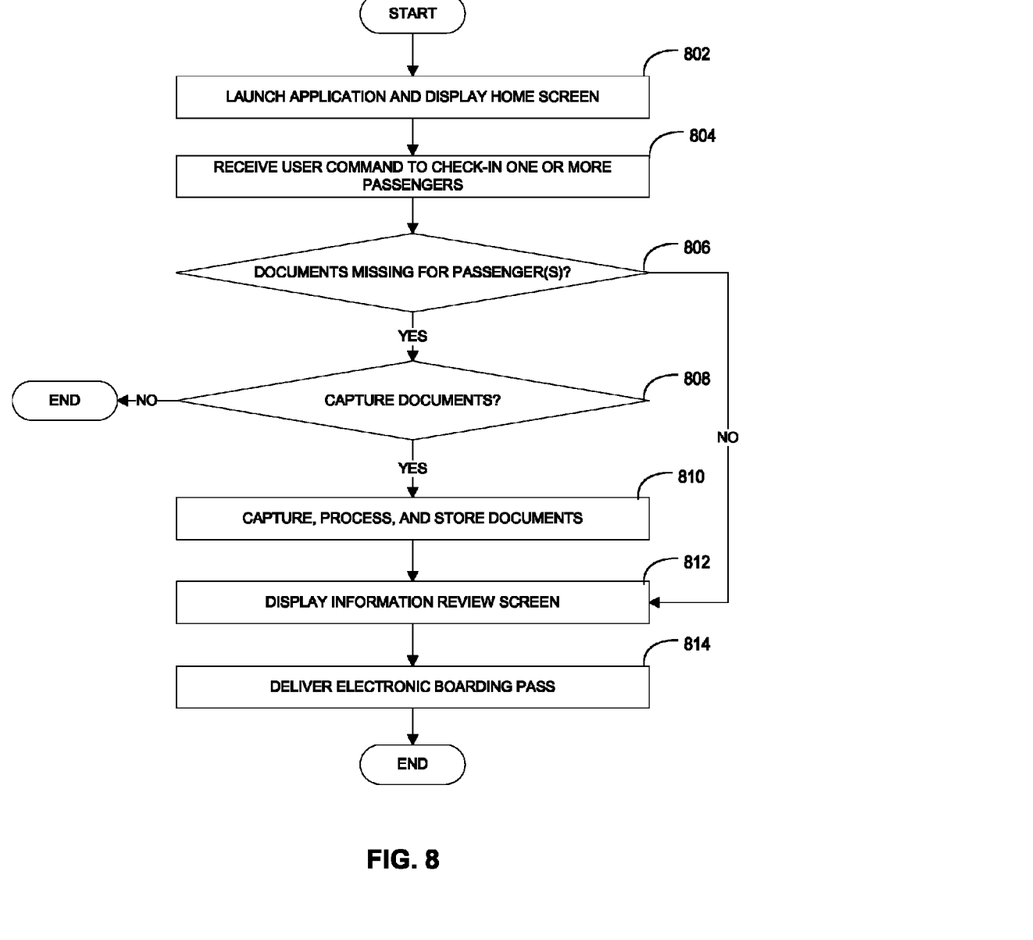
FIG. 8 is a flow diagram of an example method for checking into a flight, capturing travel documents, and delivering an electronic boarding pass.

FIG. 8 is a flow diagram of an example method 800 for the expedited check-in for international flights using electronic travel documents. More particularly, one or more software modules or applications running on the application server 140, OCR server 170, and/or network enabled devices 206-216 may implement the method 800 to allow a user to check-in to an international flight without interacting with airline personnel. First, a user may initiate an application 254A by inputting a command to the device 212 (e.g., by activating a button on the home screen of the device 212) (block 802). A user command to check in one or more passengers may be received (block 804). Such a command may include, for example, a selection of the button 288 discussed above. A software module determines whether some or all travel document information is missing (e.g., the travel document is not stored on the application server 140 or device 212) for one or more of the passengers (block 806). If information is travel document information is missing, the user 204 may be prompted to select whether to capture travel document information, for example by selecting either the button 602 or 604 discussed above (block 808). If the user 204 elects to capture travel document information, the device 212 may capture, process, and store the travel document information (block 810). The process of capturing, processing, and storing travel document information is discussed in further detail below in relation to FIGS. 9A and 9B. After capturing, processing, and storing the travel document information for each passenger, the user 204 may review the travel document information for each passenger (block 812).

After the travel document information has been reviewed, the application server 140 or other back-end component 104 may compare the travel document information for each passenger to a list of passengers (and associated passenger travel document information) registered for the flight. If the travel document information matches the list of passengers (e.g., the name, gender, date of birth, passport information, etc. matches exactly), electronic boarding passes for each passenger for each flight in the travel itinerary may be sent to the mobile device 212 (e.g., by electronic mail) (block 814). The customer may use the electronic boarding pass to pass through airport security and board his or her designated international flight. The electronic boarding pass may include a visual icon that can optically scanned such as a one- or two-dimensional barcode. Additionally or alternatively, the electronic boarding pass may include a wirelessly transmitted code which may be wirelessly transmitted (e.g., via Bluetooth®, Wi-Fi®, RFID, NFC, cellular data, etc.) to a scanner.

Before sending an electronic boarding pass to the device 212, it may be advantageous to verify that the user has all of the travel documents he or she may need to enter the country to which he or she is travelling. In addition to verifying that the user has a passport, it may be advantageous to verify that the user has a visa to enter the foreign county, if a pre-approved visa is required for the user to enter the country. For example, if the user is a US citizen traveling to Russia, the user may need both a US passport and a Russian visa. To avoid potential fines from the US and/or Russian governments, if may be advantageous for the airline to verify that the user has both documents. If the user lacks both travel documents, the airline may decline to send an electronic boarding pass to the device 212. Additionally or alternatively, it may be advantageous to verify that the user has a return flight booked, which may be required to enter certain countries. Further, it may be advantageous to verify that the user has a provided an address of where he or she will be staying in the country to which he or she is travelling, which may be required to enter certain countries. Of course, it will be understood that entry requirements may vary from country to country. Accordingly, it may be advantageous for the system 100 to verify that the user 204 can meet all of the entry requirements prior to sending an electronic boarding pass to the device 212.

Figure 9A:
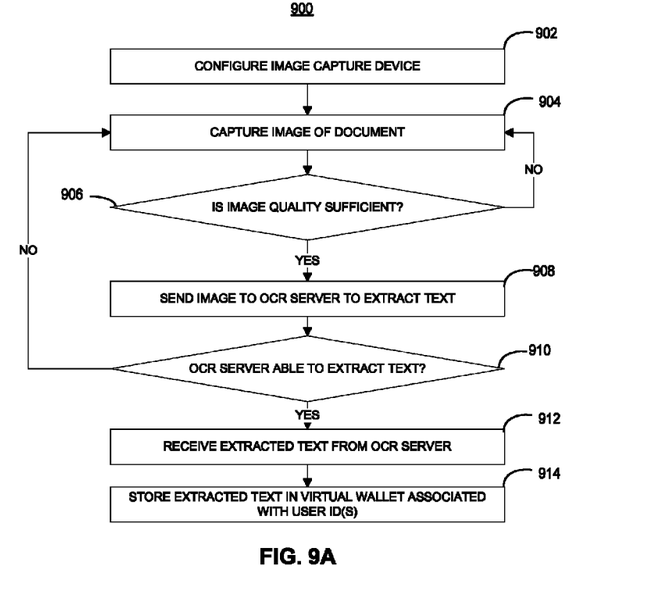
FIG. 9A is a flow diagram of an example method of capturing, processing, and storing visual information from a travel document.

FIG. 9A is a flow diagram of an example method 900 of capturing, processing, and storing travel document information as discussed in block 810. More particularly, one or more software modules or applications running on the application server 140, OCR server 170, and/or network enabled devices 206-216 may implement the method 900 to capture and process visual information from an MRZ. Before capturing an image of an MRZ, the image capture device may need to be configured (block 902). For example, the application 254A and/or subroutine 254B may configure electrical, mechanical, and optical components of the image capture device 266 and its corresponding control circuitry. In particular, the electrical, mechanical, and optical components may be configured to account for ambient lighting conditions and the characteristics of the MRZ being scanned. For example, if the ambient lighting conditions are low (e.g., from diffused fluorescent lighting inside an airport terminal) the exposure and image stabilization settings of the image capture device may be configured for low lighting (e.g., a longer exposure time and increased image stabilization to counteract movement during the longer exposure). Additionally, the electrical, mechanical, and optical components of the image capture device 266 may be configured to focus on the MRZ. To ensure the highest level of detail and clarity possible, it may be advantageous to minimize the distance between the image capture device 266 and the MRZ in which case the image capture device 266 should be configured for short range focus. The image capture device 266 may also be configured to account for the glossy covering applied to many travel documents which may cause glare under certain lighting conditions.

After the image capture device 266 is configured, an image of the MRZ may be captured, for example as discussed in connection to FIG. 7 above (block 904). A software module (e.g., the application 254A) may determine whether the image captured at block 904 is of sufficient quality such that optical character recognition (e.g., the image captured is not too blurry, too poorly lit, has too much glare obscuring the MRZ, etc.) (block 906). If the image is judged to be of sufficient quality, the image may be transmitted to the OCR server 170 for OCR (block 908). It may be advantageous for the device 212 to directly transmit the image to the OCR server 170 over the network 130. Alternatively, it may be advantageous for the device 212 to transmit the image to the application server 140 which may relay the image to the OCR server over the network 130. The OCR server 170 may employ known algorithms to determine that the image contains a MRZ, ascertain the format of the MRZ, and extract the text in the MRZ from the image. If the OCR server 170 was able to extract the text from the MRZ (block 910), the OCR server 170 may transmit the extracted text to the device 212 and/or the application server 140 to relay to the device 212 (block 912). If the OCR server 170 was unable to extract some or all of the text from the MRZ in the captured image, the method 900 may loop back to block 904 to try again. After the extracted text has been received by the device 212 and/or application server 140, the travel document information may be stored in memory in a "virtual wallet" associated with the user account corresponding to the traveler (block 914). The information in the virtual wallet may be recalled for subsequent international flights to allow the user to check-in without having to rescan the travel documents.

Figure 9B:
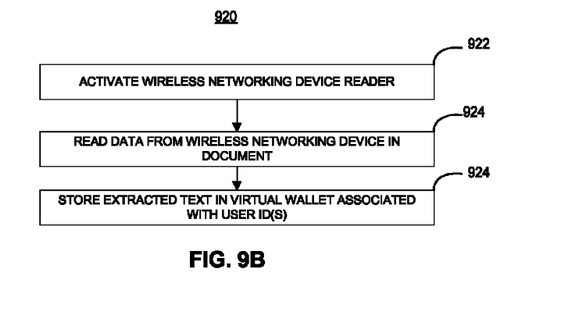
FIG. 9B is a flow diagram of an example method of capturing, processing, and storing wirelessly transmitted information from a travel document.

FIG. 9B is a flow diagram of an example method 920 of capturing, processing, and storing travel document information as discussed in block 810. More particularly, one or more software modules or applications running on the application server 140, OCR server 170, and/or network enabled devices 206-216 may implement the method 900 to capture and process wirelessly transmitted information from an RFID or NFC chip embedded in a travel document. The RFID/NFC device reader 281 of the mobile device may produce an electromagnetic field to induce an electrical current in an RFID or NFC chip embedded in a travel document (block 922). The electromagnetic field may induce a current inside a receiving coil of the RFID or NFC chip and cause a component of the RFID or NFC chip to wirelessly communicate travel document information stored thereon according to known methods (block 924). The travel document information may be stored in memory in a "virtual wallet" associated with the user account corresponding to the traveler (block 926). The information in the virtual wallet may be recalled for subsequent international flights to allow the user to check-in without having to rescan the travel documents.

As discussed above, the device 212 is merely an example network enabled device 206-216 with which the travel document information may be captured, processed, and stored. For example, in addition to the device 212 being used to perform the methods 900 and/or 920, any of the network enabled devices 206-216 may be used. For example, the method 900 may be implemented with a laptop computer 214 connected to a scanner and/or a webcam in which the scanner or webcam perform the functions of the image capture device 266. Additionally or alternatively, the laptop computer 214 may be connected to an RFID or NFC device reader 281 and perform the method 920. Further, the methods 900 and/or 920 may be performed by airline personnel on an airline terminal or at a self-serve airline kiosk terminal. While having airline personnel or a self-serve airline kiosk terminal capture the travel document information does not allow a user to bypass the airline personnel or kiosks when the travel document information is captured, by storing the travel document information in the virtual wallet the user may still bypass airline personnel and kiosks for subsequent check-ins.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed:

1. A method of issuing an electronic boarding pass for a first international flight, the method comprising:
   (a) receiving, from a network-enabled device, travel document information from a travel document associated with a passenger, wherein the travel document information is captured by the network-enabled device via one of (i) visual image capture or (ii) wireless communication with a wireless communication device included in the travel document;
   (b) comparing the travel document information to registered passenger travel document information associated with a list of registered passengers for the first international flight;
   (c) based on the comparing, determining that the passenger associated with the travel document is registered for the first international flight; and
   (d) in response to determining that the passenger is registered for the first international flight, issuing the electronic boarding pass by sending the electronic boarding pass to the network-enabled device;
   wherein steps (a)-(d) are performed with one or more computer processors.

2. The method of claim 1, wherein the travel document is one of a passport, permanent resident card, or visa.

3. The method of claim 1, wherein receiving the travel document information comprises:
   receiving an image of the travel document; and
   performing optical character recognition (OCR) on the image to extract a machine readable zone (MRZ) included in the travel document.

4. The method of claim 1, wherein the wireless communication is one of a radio frequency identification communication or a near field communication.

5. The method of claim 1, wherein the travel document information is Advanced Passenger Information System (APIS) information.

6. The method of claim 1, further comprising:
   (e) receiving, from the network-enabled device, a request to check into a second international flight;
   (f) comparing the travel document information to additional registered passenger travel document information associated with a list of registered passengers for the second international flight;
   (g) based on the comparing, determining that the passenger associated with the travel document is registered for the second international flight; and
   (h) in response to determining that the passenger is registered for the second international flight, issuing an additional electronic boarding pass by sending the additional electronic boarding pass to the network-enabled device;
   wherein steps (e)-(h) are performed using one or more processors.

7. The method of claim 1, further comprising:
   (e) receiving, from the network-enabled device, credit card information associated with the passenger, wherein the credit card information is captured by the network-enabled device via one of visual image capture or wireless communication wherein step (e) is performed by one or more processors.

8. A system for issuing an electronic boarding pass for an international flight, comprising:
   an input/output circuit adapted to communicate with a network-enabled device via a network;
   a memory configured to store a set of computer-executable machine readable instructions; and
   a processor configured to execute the set of computer-executable machine readable instructions to cause the processor to:
   receive, from the network-enabled device via the input/output circuit, travel document information from a travel document associated with a passenger, wherein the travel document information is captured by the network-enabled device via one of (i) visual image capture or (ii) wireless communication with a wireless communication device included in the travel document,
   compare the travel document information to registered passenger travel document information associated with a list of registered passengers for the international flight,
   based on the comparison, determine that the passenger associated with the travel document is registered for the international flight, and
   in response to determining that the passenger is registered for the international flight, issue an electronic boarding pass by sending the electronic boarding pass to the network-enabled device via the input/output circuit.

9. The system of claim 8, wherein the travel document is one of a passport, permanent resident card, or visa.

10. The system of claim 8, further comprising:
    an optical character recognition (OCR) module;
    wherein the travel document information is an image of the travel document, and wherein the OCR module is configured to extract a machine readable zone (MRZ) included in the travel document.

11. The system of claim 8, wherein the wireless communication is one of a radio frequency identification communication or a near field communication.

12. The system of claim 8, wherein the travel document information is Advanced Passenger Information System (APIS) information.

13. The system of claim 8, wherein the processor is further configured to:
    receive, from the network-enabled device via the input/output circuit, a request to check into an additional international flight,
    compare the travel document information to additional registered passenger travel document information associated with a list of registered passengers for the additional international flight,
    based on the comparison, determine that the passenger associated with the travel document is registered for the additional international flight, and
    in response to determining that the passenger is registered for the additional international flight, issue an additional electronic boarding pass by sending the additional electronic boarding pass to the network-enabled device via the input/output circuit.

14. The system of claim 8, wherein the processor is further configured to:
    receive, from the network-enabled device via the input/out circuit, credit card information associated with the passenger, wherein the credit card information is captured by the network-enabled device via one of visual image capture or wireless communication.

* * * * *

UNITED STATES PATENT AND TRADEMARK OFFICE
CERTIFICATE OF CORRECTION

PATENT NO. : 9,152,930 B2
APPLICATION NO. : 13/844473
DATED : October 6, 2015
INVENTOR(S) : Zhi Wang et al.

It is certified that error appears in the above-identified patent and that said Letters Patent is hereby corrected as shown below:

In the Claims:

At Column 18, line 31, "input/out" should be -- input/output --.

Signed and Sealed this
Fifth Day of April, 2016

Michelle K. Lee
*Director of the United States Patent and Trademark Office*